(12) United States Patent
Palin et al.

(10) Patent No.: US 7,831,717 B2
(45) Date of Patent: Nov. 9, 2010

(54) CONNECTIVITY INFORMATION SHARING IN A SMART SPACE HAVING A MULTIPLICITY OF RADIO ACCESS TECHNOLOGIES

(75) Inventors: Arto Palin, Viiala (FI); Timo O. Eriksson, Helsinki (FI); Joni Jantunen, Helsinki (FI); Jarmo Arponen, Espoo (FI); Juha-Matti Tuupola, Tampere (FI); Olli Tyrkkö, Espoo (FI); Sampo Sovio, Riihimäki (FI)

(73) Assignee: Nokia Corporation, Espoo (FI)

( * ) Notice: Subject to any disclaimer, the term of this patent is extended or adjusted under 35 U.S.C. 154(b) by 449 days.

(21) Appl. No.: 11/809,639

(22) Filed: May 31, 2007

(65) Prior Publication Data

US 2008/0301301 A1 Dec. 4, 2008

(51) Int. Cl.
*G06F 13/00* (2006.01)
(52) U.S. Cl. ..................................... 709/227
(58) Field of Classification Search ................. 709/227; 725/81
See application file for complete search history.

(56) References Cited

U.S. PATENT DOCUMENTS

| | | | |
|---|---|---|---|
| 6,604,140 B1 | 8/2003 | Beck et al. ................ | 709/226 |
| 2003/0100308 A1 | 5/2003 | Rusch ....................... | 455/445 |
| 2003/0236890 A1 | 12/2003 | Hurwitz et al. ............ | 709/227 |
| 2005/0013259 A1 | 1/2005 | Papoushado et al. | |
| 2005/0071879 A1* | 3/2005 | Haldavnekar et al. ........ | 725/81 |
| 2005/0097087 A1 | 5/2005 | Punaganti Venkata et al. .. | 707/3 |
| 2005/0138173 A1 | 6/2005 | Ha et al. .................... | 709/225 |
| 2005/0193106 A1 | 9/2005 | Desai et al. ................. | 709/223 |
| 2005/0254472 A1 | 11/2005 | Roh et al. .................. | 370/338 |
| 2007/0058630 A1 | 3/2007 | Fujimoto .................... | 370/390 |

FOREIGN PATENT DOCUMENTS

EP 1 858 210 A1 11/2007

OTHER PUBLICATIONS

Quiroz, Carlos et al., "Version vectors based synchronization engine for mobile devices", Software and Application Technologies Laboratory, Nokia Research Center, Proceeding Parallel and Distributed Computing and Networks—2007.
Final Technology Evaluation Report, SIRENA ITEA 02014 Project, V1.0, May 14, 2004.
Lent, Ricardo, "Smart Packet-based Selection of Reliable Paths in Ad Hoc Networks", IEEE Sep. 2005, 0-7803-9439.
Raverdy et al. "Efficient Context-aware Service Discovery in Multi-Protocol Pervasive Environments", 2006.
Raverdy et al. "A Multi-Protocol Approach to Service Discovery and Access in Pervasive Environments", 2006.
Kim et al. "Service discovery using FIPA-compliant AP to support scalability in ubiquitous environments", 2005.
Scholten et al. "Secure service discovery in home networks".
International Search Report dated May 31, 2007.

\* cited by examiner

*Primary Examiner*—Robert B Harrell
(74) *Attorney, Agent, or Firm*—Harrington & Smith

(57) ABSTRACT

An apparatus and method for storing and maintaining in a smart space device connectivity information of devices of the smart space including a plurality of disparate radio access technologies. The connectivity information is propagated to at least one other device of the smart space and is used for selecting an optimal distribution route for information to be shared in the smart space. Technologies such as NoTA, Bill-Board and Whiteboard can be used.

20 Claims, 11 Drawing Sheets

US 7,831,717 B2

CONNECTIVITY INFORMATION SHARING IN A SMART SPACE HAVING A MULTIPLICITY OF RADIO ACCESS TECHNOLOGIES

FIELD OF THE INVENTION

The present invention generally relates to ad-hoc networking in a smart space type of environment where devices form connections with each other. The invention relates particularly, though not exclusively, to a smart space type of environment in which devices propagate to each other connectivity information of other devices previously obtained.

BACKGROUND OF THE INVENTION

Smart space is a topic that has been touched in many ways. The definition of smart space is many-sided, many times related to ubiquitous computing and smart networking. Nowadays, the wireless techniques enable the utilization of smart space type of ideas in a very broad way.

Basically in every smart space there is a Service Provider (SP) and a Service User (SU) and a way how the SP and SU can connect (or interconnect) with each other. This is depicted in FIG. 1. In a simple form, the SP can be for example a Bluetooth printer and the SU for example a mobile terminal, and these devices are interconnected by Bluetooth. This kind of example is easy to handle and can be built upon one connectivity technique. However, generally the SP could offer services over any type of connectivity technique. On the other hand, in some cases, the SP can utilize only some or none of them. How to find proper connectivity technique in this case is more complicated. Furthermore, there may be more than one SPs and SUs. Yet furthermore, mobile devices set limits for powering issues, which further complicates connectivity solutions.

To find out connectivity information in a smart space (that is, discovering devices, which bearers do the devices have, which services are provided via them, how to connect with them) typically requires massive scan operations. Basically, every bearer has to scan the surroundings to find out whether there are any devices which use the same bearer. Because there is no standardized way to arrange this, each bearer has to be activated for a certain period of time to find out other devices. Due to powering issues and multi-radio problems it may not be possible to use several bearers at the same time to find out connectivity information of the multiple other devices located in the smart space. This whole matter consumes a lot of power. The result may yet be that not every device/service in the smart space is discovered.

SUMMARY

According to a first aspect of the invention there is provided an apparatus, comprising:

a radio bearer arranged for propagating previously obtained connectivity information of devices of a smart space to at least one other device of the smart space; and a memory arranged for storing and maintaining connectivity information of devices of the smart space comprising a plurality of disparate radio access technologies.

In an embodiment, the apparatus is further configured to propagate information about services provided by the smart space devices.

In an embodiment, the apparatus is a multi-bearer apparatus comprising a first radio bearer and a second radio bearer different from the first radio bearer, the apparatus being configured to receive connectivity information over the first radio bearer and to propagate connectivity information to at least one other device of the smart space over the second radio bearer.

In an embodiment, the apparatus is configured to decide a distribution route, based on shared device characteristics, for information which needs to be shared.

In an embodiment, the apparatus is further configured to propagate to another device of the smart space information comprised by a logical information repository, such as a Whiteboard, which is common to each of the devices of the smart space.

In an embodiment, the apparatus comprises a service advertisement board, such as a BillBoard, for advertising different services provided by the devices of the smart space.

In an embodiment, the connectivity information is arranged in a connectivity map in a low interconnect section of a device which is compliant with a service based interconnect centric platform architecture, such as NoTA.

In an embodiment, the disparate radio access technologies are selected from a group comprising at least: Bluetooth, WLAN, WiMAX, Wibree, UWB, and cellular technologies.

According to a second aspect of the invention there is provided a method, comprising:

storing and maintaining in a smart space device connectivity information of devices of the smart space comprising a plurality of disparate radio access technologies;

propagating the connectivity information to at least one other device of the smart space.

In an embodiment, the connectivity information for smart spaces is the connectivity information of the space as such (if networked), or it can be the connectivity information of the individual devices. Hence, the connectivity information (or connectivity map) can include information regarding connectivity techniques supported by certain device(s) or it can even include information how devices are connected or could connect to each other, thus forming a kind of topology map of smart space connectivity between devices. The connectivity information of the whole space can be delivered over one bearer, by utilising a connectivity table/map, which defines the way how the device/services are accessible. This can include information from the radio level up to the service utilisation.

In an embodiment, a smart space device which can not provide a certain service or certain information by itself may contain information about where and how such a service or information is available/accessible. That kind of accessibility information the smart space device can deliver to an interested party (that is another device of the smart space, for example, a device entering the smart space) so that the interested party can then directly or indirectly contact the device providing the desired service or containing the desired information.

In an embodiment, the smart space is a "smart home" system where home appliances or any electronic devices capable of wireless communication form an ad-hoc network for co-operation and information sharing. In an embodiment, the devices comprise different radio access technologies, meaning that not all the devices share one common radio technology. In an embodiment, a connectivity map is collected and forwarded over a suitable bearer connection to a new device entering the smart space.

In an embodiment, the devices forming the smart space network are not in the same physical/access network, that is, they are physically in different type of networks, but can still be networked without a need to include extra radio interfaces to the devices. In an embodiment, a device may form a bridge between two devices not sharing a common radio access technology. In an embodiment, there is no need for every device to join the same physical network to share information, since the information to be shared is shared over any suitable connectivity technique. Hence, low power techniques can be used to find connectivity information of the smart space, of course assuming that at least one device is sharing that information with the same technique.

In an embodiment, connectivity information indicates connection possibilities with disparate protocols and/or physical transports. In an embodiment, the protocols are close to physical layer. In an embodiment, the connectivity information indicates the supported communication protocols and transports that each of the devices support.

In an embodiment, a local list of connectivity parameters of the devices nearby is kept in a device and this information is shared with other devices. In an embodiment, the sharing is done over at least two different radio access technologies. In an embodiment, different connectivity technique information of an ad-hoc network is shared by a participating device without actually being part of the whole network, but by being part of a smart space concerned.

In an embodiment, information pertaining to service availability in a smart space and a connectivity map of the smart space together form a way of service access information which delivery is independent of used transport.

According to a third aspect of the invention there is provided an apparatus in accordance with claim 17.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

Figure 1:
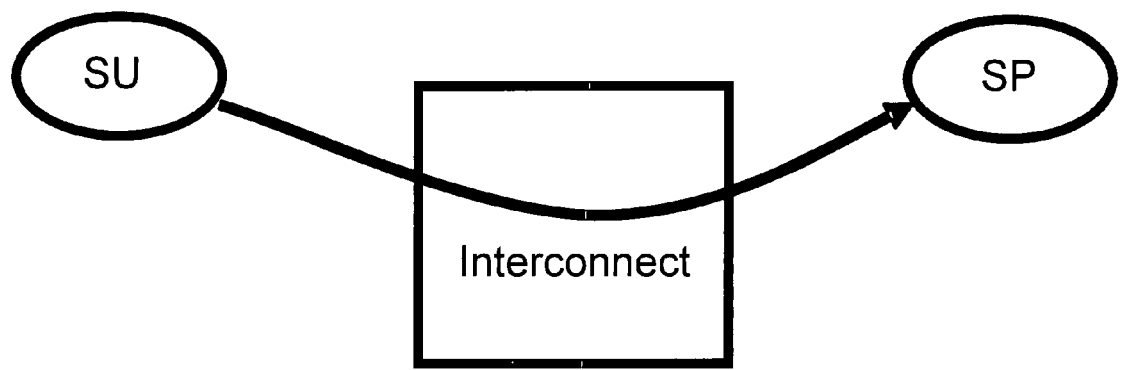
FIG. 1 shows interconnecting in a smart space.
Figure 2:
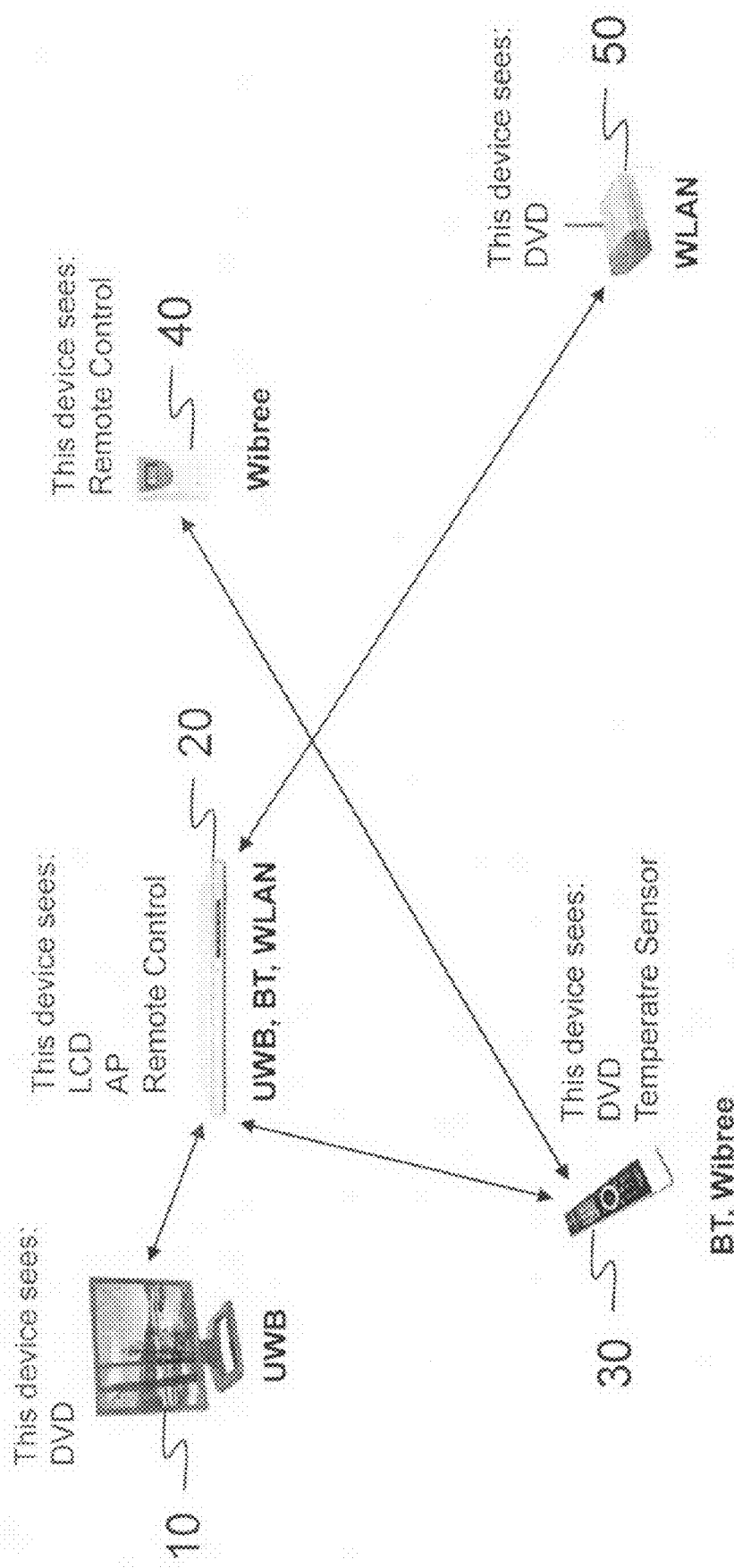
FIG. 2 shows an example set of devices operating in a smart space in accordance with an embodiment;.

Turning to FIG. 2, for the purpose of an embodiment, a room, for example a living room is considered a smart space. The smart space contains an LCD television 10, a DVD player 20, a remote control 30, a temperature sensor 40 and a WLAN access point 50. Each of the devices 10-50 of the smart space has a set of different bearers which are shown in FIG. 2 below each device with a bold font style. The LCD television 10 is connected to the DVD player 20 with an UWB radio. The DVD player 20 has a WLAN connection to the WLAN access point 50. As well, the DVD player 20 has Bluetooth connectivity to the remote control 30. The remote control has in addition a Wibree connection to the temperature sensor 40.

In the context of the present invention, the word "bearer" is also understood to include passive technologies such as RFID.

Figure 3:
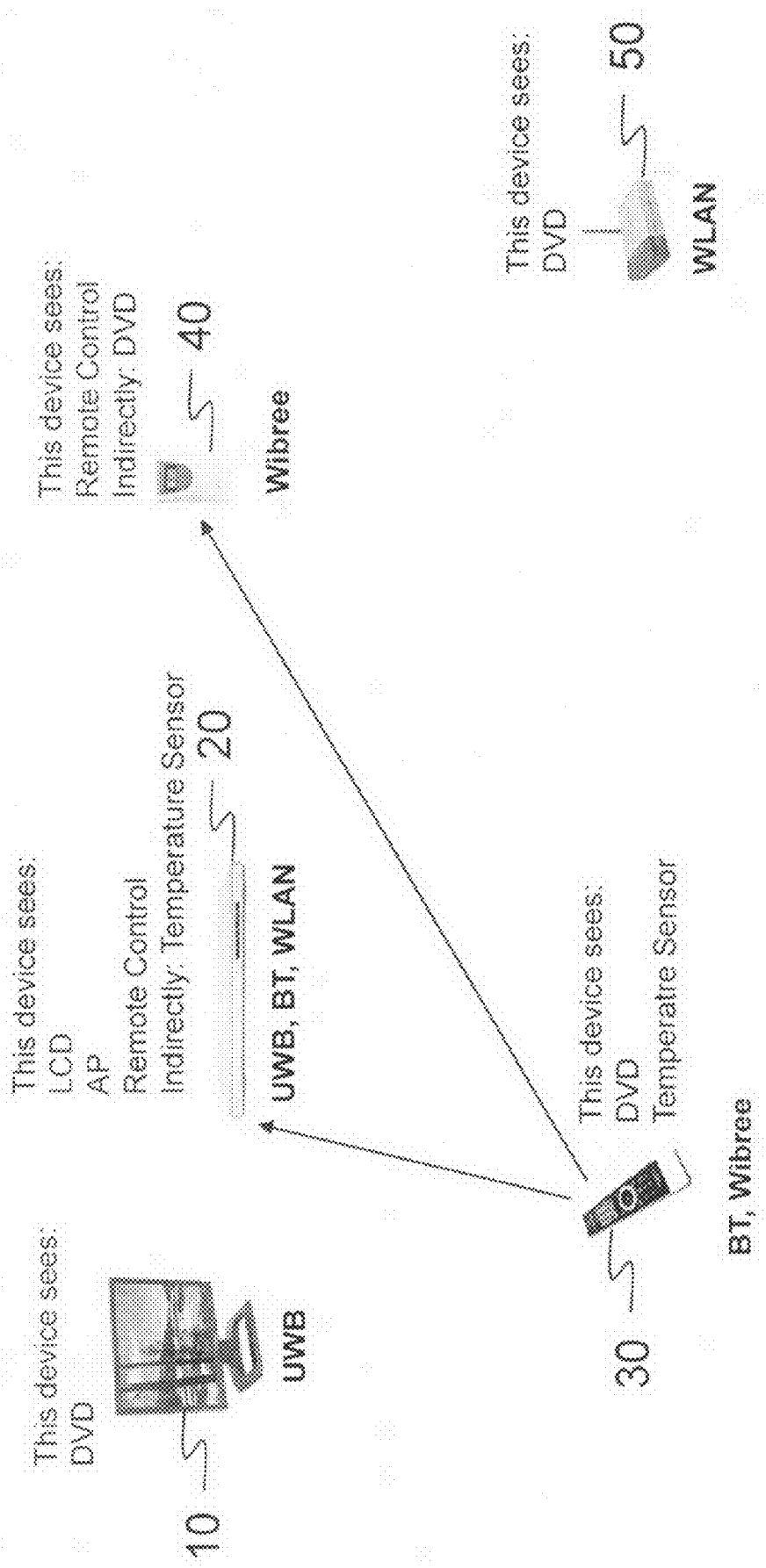
FIGS. 3-7 show a process of sharing connectivity information between devices in accordance with an embodiment.
Figure 4:
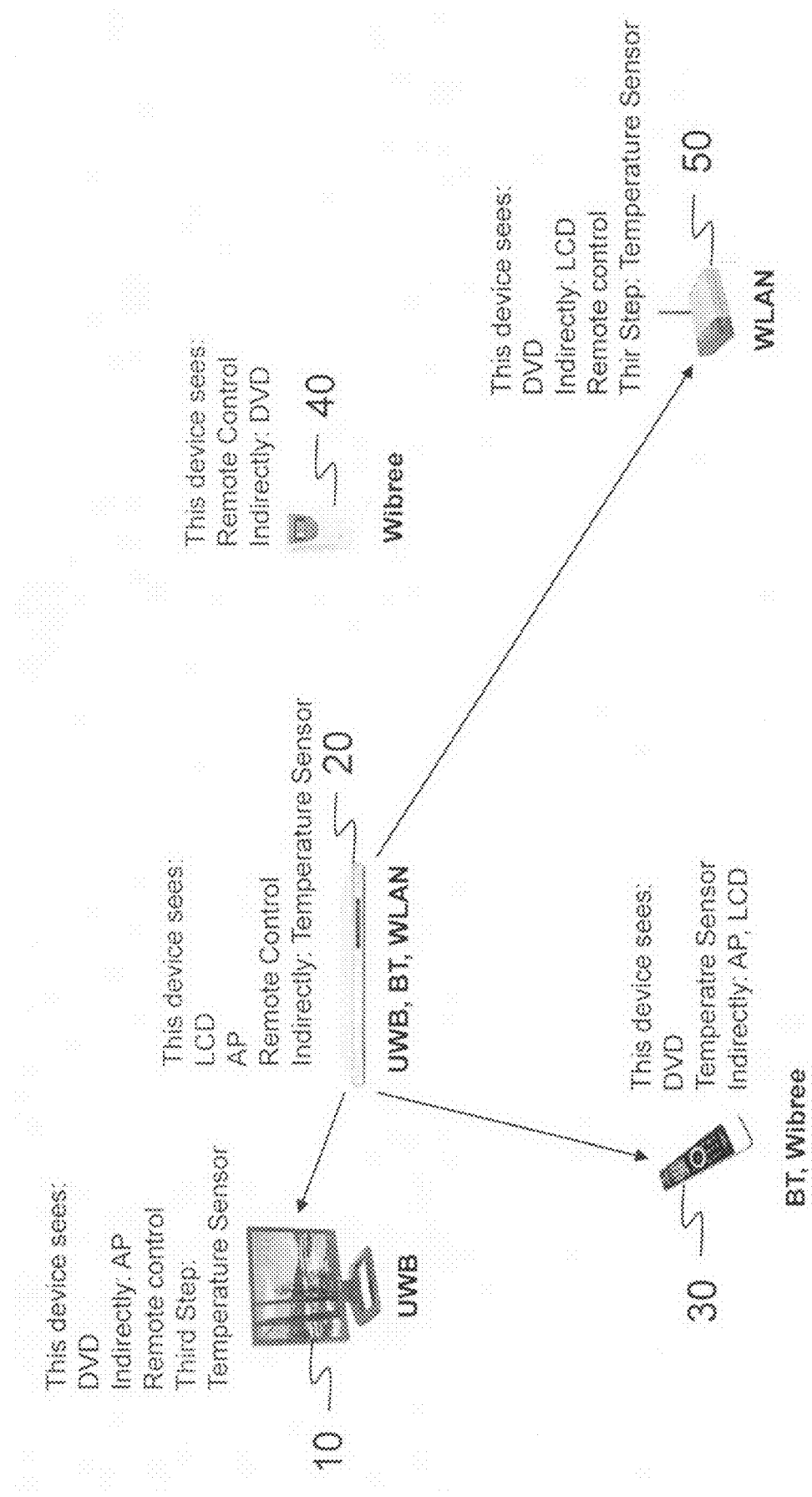
Figure 5:
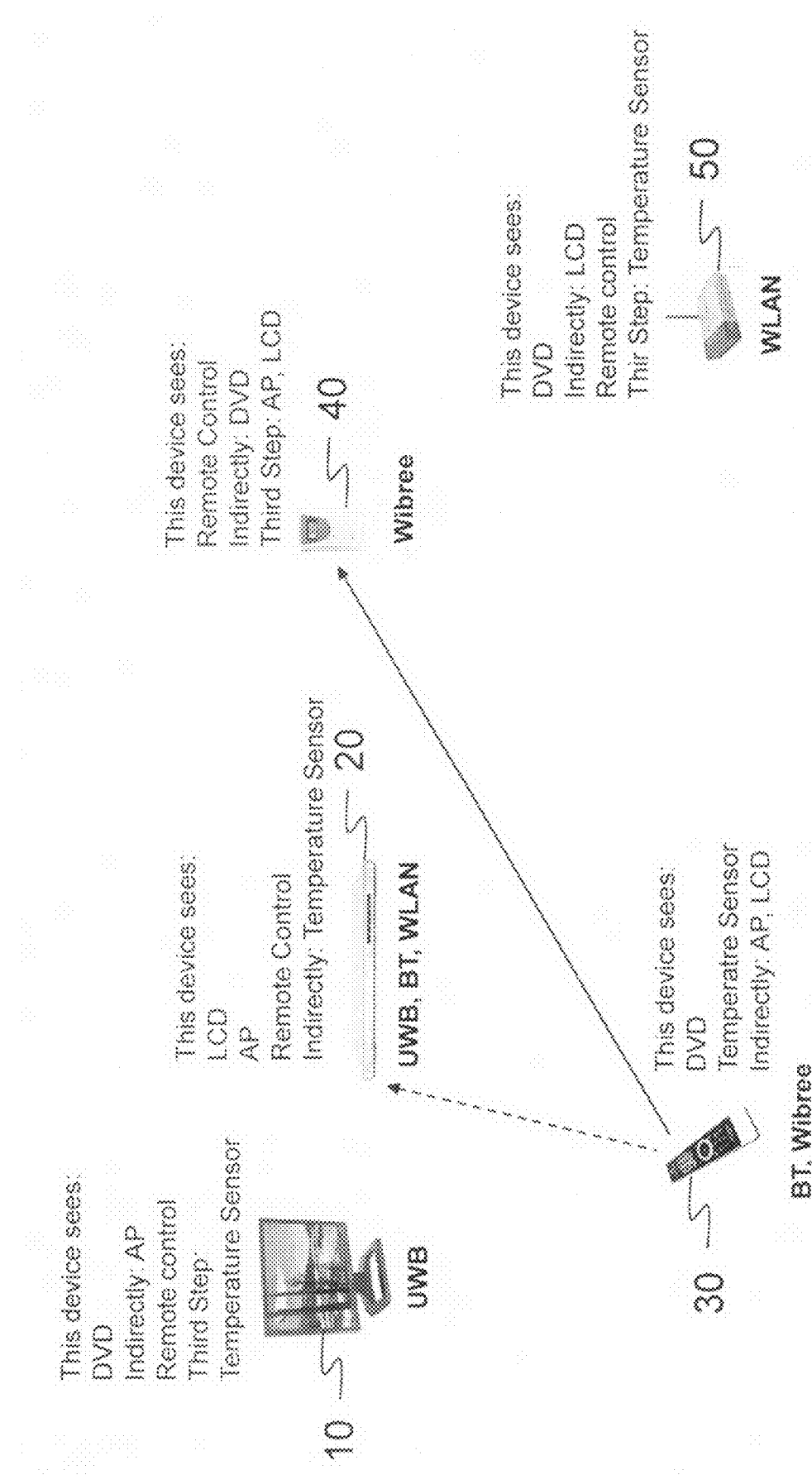

When the devices 10-50 are being used for the first time, or if a new device enters the smart space, the procedure shown in FIGS. 3-5 or a similar one is carried out. Turning now to FIG. 3, the remote control 30, for example, can read a connectivity map (stored therein) of the devices to which it can interconnect. In a first step in FIG. 3 the remote control 30 sends out the connectivity information of the temperature sensor 40 to the DVD player 20. The DVD player 20 stores this indirectly obtained connectivity information into its connectivity map. The connectivity information can include, for example, the type of connectivity, a radio channel, and/or other connectivity parameters and information of the device. In addition (if the temperature sensor 40 is capable to receive and store connectivity information) the remote control 30 delivers connectivity information regarding the DVD player 20 to the temperature sensor 40. The temperature sensor 40 stores this indirectly obtained connectivity information into its connectivity map.

In the next step, as shown in FIG. 4, the DVD player 40 shares its connectivity information with the LCD television 10, WLAN access point 50 and remote control 30. Each respective device 10, 30 and 50 stores indirectly received or as a third step received connectivity information in its respective connectivity map. Now, for example, the LCD television 10 has its connectivity map updated with the following information: the DVD player 20 (to which the LCD television 10 is directly connectable) provides for connectivity to the remote control 30 (in LCD television's connectivity map this would be indicated, for example, as "indirectly") and for one step further "third step" there is the temperature sensor 40. Thus the LCD television 10 has information of the network connectivity and topology, in other words it knows which devices can connect to which, and what kind of connectivity technology is used. The technology does not need to be identified as such, since the technologies are disparate. For example, "technology 1", "technology 2", and so on, could be used in certain embodiments to classify the connectivity technologies used.

In the next step, as shown in FIG. 5, since the connectivity map in the remote control 30 has changed in the previous step, the remote control 30 updates the connectivity map of the temperature sensor 40 with the changed information (the third step information concerning the LCD television 10 and the WLAN access point 50). It should be noted that, in the beginning, it is also possible for the remote control 30 to read DVD connectivity information (dashed line arrow) to find out if there are any changes. Generally, no updating action is needed if the connectivity information has not been changed.

Figure 6:
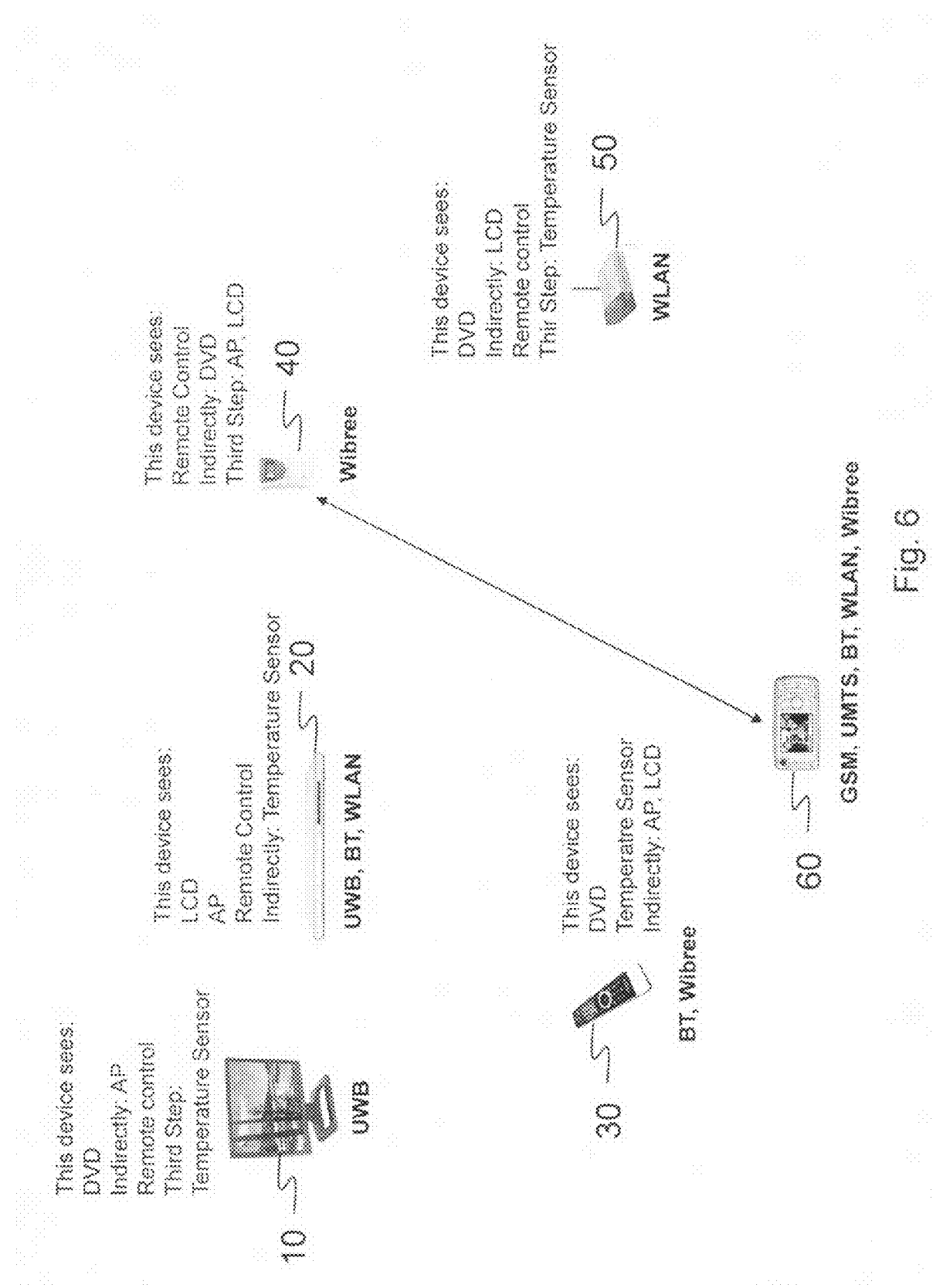
Figure 7:
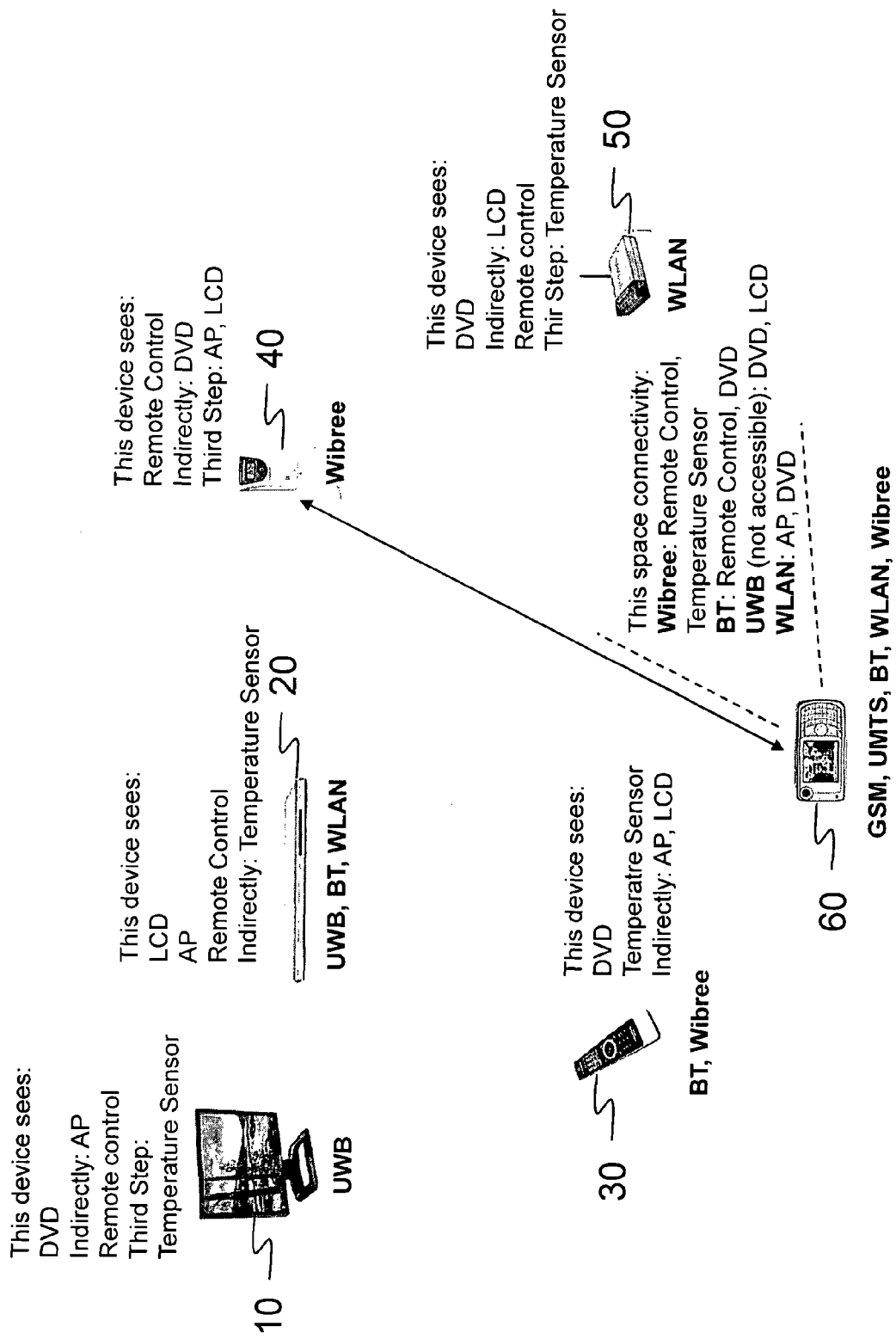

Now when a device, for example, a mobile terminal 60 in FIG. 6, enters the smart space the connectivity information of the whole room can be delivered by any of the devices 10-50 in the room. In FIG. 7 the complete connectivity information of the smart space is delivered over Wibree from the temperature sensor 40. The mobile terminal 60 thereby obtains the information about the connectivity map (containing both device and bearer information) over the Wibree link. Also information regarding links that can not be utilised is delivered. The foregoing procedure does not need user interaction, but can be run between as a background process between different devices. In the instant example, the mobile terminal 60 could use the connectivity information to discover a way to interact with the LCD television 10 despite the fact that the devices 10 and 60 do not share an access technology (the terminal 60 does not support UWB). The mobile terminal 60 can access the DVD player 20, for example, using WLAN, and the LCD television 10 through the DVD player 20 as the DVD player 20 does support UWB.

In another embodiment, information about associated services offered by the smart space devices is stored and maintained in the smart space devices. This information pertaining to different services (or service availability) can be arranged in a service advertisement board ("BillBoard" or similar) in devices 10-50, and can be propagated along the smart space like the connectivity information in the previous example. The service information may also be stored in a subset of the devices participating in the smart space. In this case the connectivity information may contain information on which devices store the service information, so that all participating devices can access it. By using both connectivity and service information, a device can know how to access services of a smart space directly and indirectly, without regard to the specific connectivity technologies needed.

Just as the connectivity map typically forms the physical level information on how the devices of the smart space can interconnect, the information pertaining to service availability forms the information about various services provided by the smart space devices. The distributed connectivity information together with the service level information forms explicit information for connecting to a certain service.

An example of the services which the service advertisement board can advertise is an information repository service, such as a "Whiteboard". The information repository is a common logical space for storing any information. Further, the information repository can be implemented either centralized (stored in one device) or de-centralized. Yet another possibility is an implementation in-between these extremes. In the last mentioned implementation and in the de-centralized case, the information in the information repository can be distributed to one or more of the devices 10-50 based on the connectivity information contained in the connectivity map.

An example of a type of framework which can be used in an embodiment is the Network on Terminal Architecture (NoTA) service based interconnect centric platform architecture for mobile devices. The interconnect centric approach with NoTA allows any physical sub-system to directly communicate with other sub-systems—supporting multiple parallel connections. Direct connection is possible due to simple switches optimized for the underlying physical media.

Figure 8:
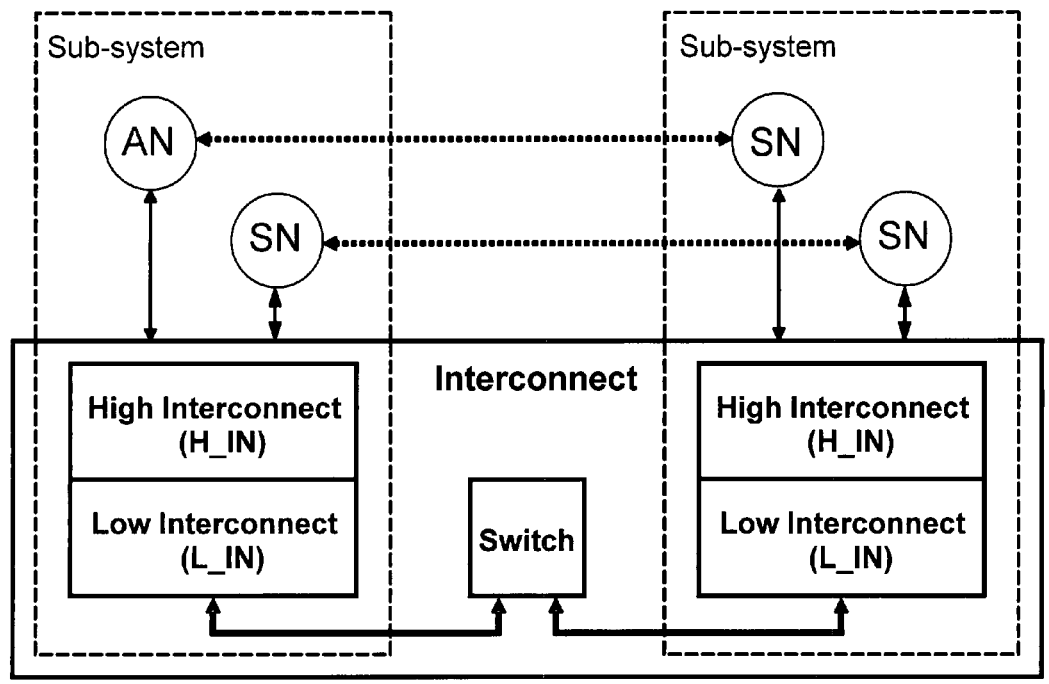
FIG. 8 shows an applicable architecture in accordance with an embodiment.

NoTA platform architecture comprises sub-systems connected together via a physical interconnect. Service Nodes (SN) and Applications Nodes (AN) are mapped into the sub-systems. NOTA interconnect contains two layers, namely High Interconnect (H_IN) and Low Interconnect (L_IN). This is shown in FIG. 8. L_IN includes ISO/OSI layers L1-L4 and provides a transport socket type interface upwards. H_IN acts as the middleware between the L_IN and the Application and Service Nodes (AN & SN) on top. A Resource Manager (RM), or Resource Management functionality, takes care of controlling service registration and access operations. Communication in NoTA is connection-oriented meaning that before any service or data communication takes place, connection setup procedure is to be carried out. Security features have been added to countermeasure the identified threats.

While NoTA conventionally provides an architecture for intra device service access, it has now been observed that a similar architecture is suitable also for inter device cases, such as for a smart space in which the sub-systems would correspond to the actual smart space devices. A basic architecture especially suited for the smart space environment is shown in FIG. 9.

Figure 9:
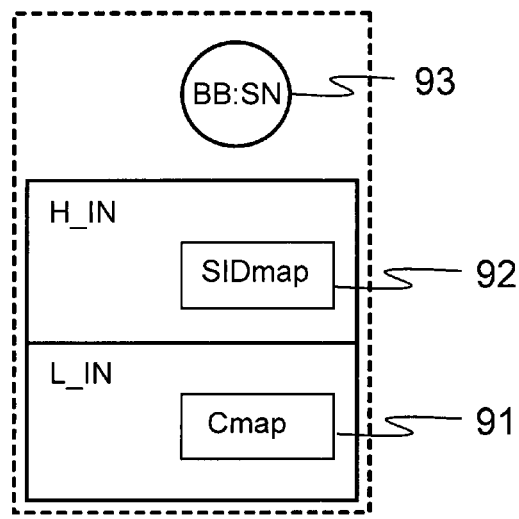
FIG. 9 shows another illustration of an applicable architecture in accordance with an embodiment.

According to this example framework, in FIG. 9, the L_IN section contains the connectivity map (Cmap) 91 for storing connectivity information of each device of the smart space. The H_IN section contains a Service IDentification map (SIDmap) 92 for service identification and on the top is the BB:SN 93, the BillBoard (BB) service node, which may be part of Resource Management (RM) functionality of the BB device, to provide information of available services. The BB may also be an independent service implementation or the BB functionality may be an integral part of the H_IN and/or L_IN. The service information as indicated by SID is linked with an Interconnect Address (IA) in which the service resides by the SIDmap 92. The IA points to a sub-system of a NoTA device. The service information is also linked with the connectivity information indicated by the connectivity map 91. Based on this it is possible to deduct the connectivity to a certain service. In an embodiment, the BB may provide service level authentication and security functions. These may, for example, define who/which device can be allowed to have a list of services of the smart space, or who/which device can be allowed to have a key to use a service.

In another embodiment, a device which has no BB capability may be able to provide information about how to access a device which has the BB capability, or other services or devices.

In another embodiment exemplifying a further refinement of the invention, in addition to the connectivity information shared between the smart space devices shown, for example, in FIGS. 2-7 also the characteristics of the participating devices 10-50 are taken into account when propagating connectivity, service information or any information in an information repository which should be shared with other devices in the smart space. Device characteristics can be considered to be, for example, limited memory, CPU, battery power, or connectivity resources. In general, any device feature or lack of features can be thought as meaningful characterization information. Based on the device characteristics (and connectivity/communication topology information) a certain device can be considered to be willing/not willing, good/bad, able/not able to perform information distribution tasks in a smart space.

Figure 10:
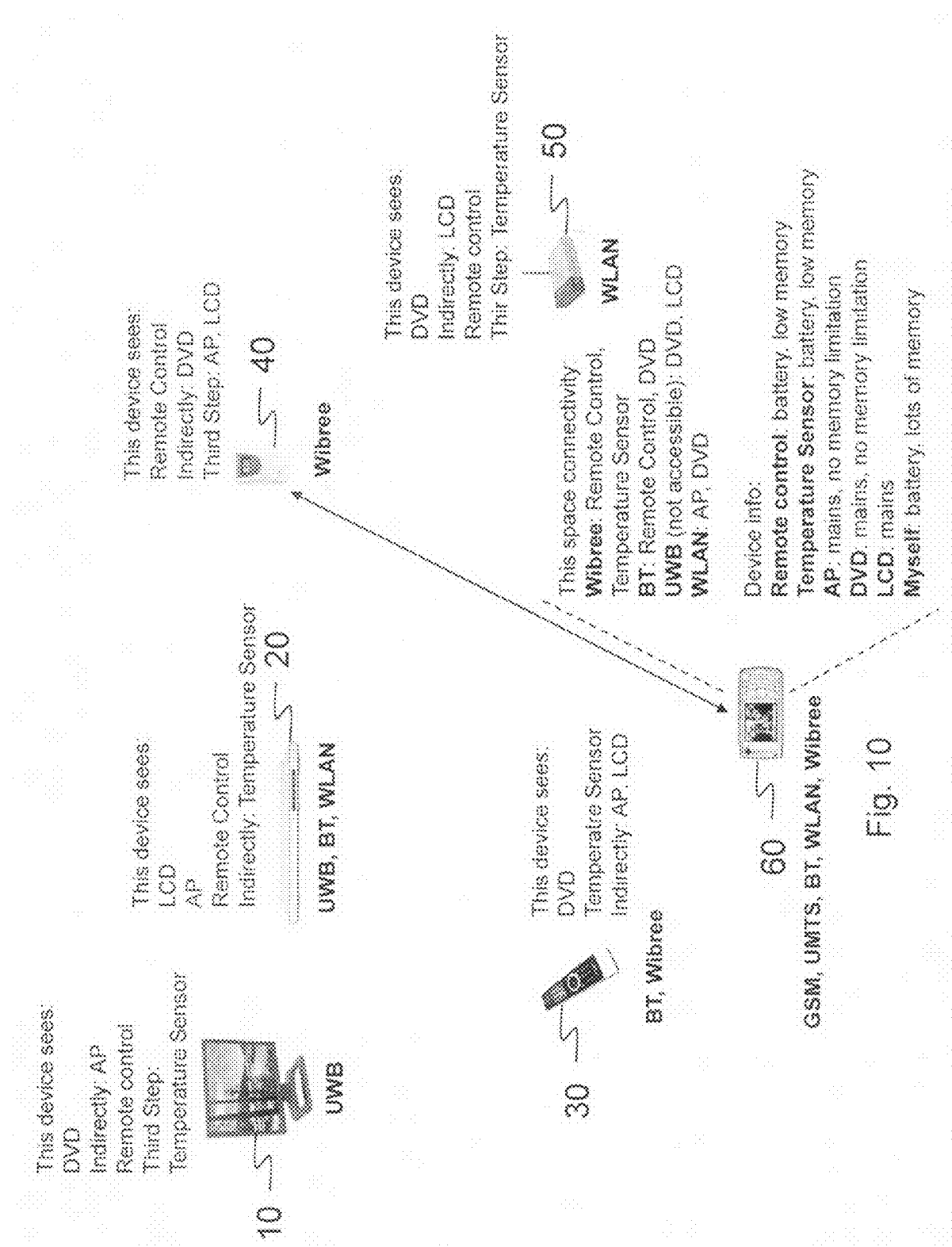
FIG. 10 shows device characteristics sharing in accordance with an embodiment.

Device characteristics combined with the understanding of the surrounding smart space environment enables devices to classify themselves and distribute their personal device features or characteristics information to other devices. Based on the knowledge of the device classification, information to be propagated across the smart space can be distributed in a more sophisticated, power efficient way. This is shown in more detail in FIG. 10, which shows the situation described in the foregoing living room example, in which the devices 10-50 in the smart space have shared their connectivity information with each other.

In this example, the devices have also shared the device characteristics and, optionally, also information about the services that each device offers. For the sake of simplicity the device characteristics delivery and usage is described only in connection with a device entering the smart space, that is, the mobile terminal 60.

The mobile terminal 60 arrives at the smart space and obtains the connectivity map of the smart space directly from the temperature sensor 40 via Wibree. The mobile terminal 60 also receives device characteristics information about the temperature sensor 40 implying that it has very limited battery power and memory available. The temperature sensor 40 has generated its connectivity map earlier and has previously received device characteristics information of the other devices in the smart space. This means that by the time the mobile terminal 60 enters the smart space the temperature sensor 40 already knows the following:

There is a WLAN access point 50 in the smart space with only a WLAN connectivity available. The WLAN access point 50 is a mains driven appliance and has plenty of memory available.

There is a remote control 30 in the smart space that can operate with Bluetooth and Wibree. The remote control 30 is battery powered and has no free memory.

There is a DVD player 20 equipped with many connectivity modules, that is, UWB, Bluetooth and WLAN. It is mains driven and is not a memory limited equipment.

There is a LCD television 10 in the smart space that has only an UWB connectivity.

The mobile terminal 60 may also receive information form the temperature sensor about the device or devices that have more information regarding, e.g., connectivity or services.

When the mobile terminal 60 arrives at the smart space it receives this very same information from the temperature sensor 40 plus the device characteristics information of the temperature sensor itself. Naturally it also knows its own capabilities and limitations.

At some point in time the mobile terminal 60, for example, may have some updated smart space information which needs to be propagated to other devices of the smart space. Such updated smart space information may be, for example, updated connectivity or service information, or any information in a information repository which should be shared with other devices. The mobile terminal 60 selects a distribution method, which it considers most optimal. The device characteristics and connectivity information of the smart space were stored in the mobile terminal 60 earlier. Based on that information the mobile terminal 60 knows that distributing updated smart space information to the DVD player 20 might be the best option, since it is the most capable device of redistributing the information further. This is because the connectivity map implies that the DVD player 20 is able to share the information to the LCD television 10 via UWB, WLAN access point 50 via WLAN and remote control 30 via Bluetooth, and also because the device characteristics of the DVD player 20 also support this choice: the DVD player 20 can be assumed to be willing to distribute smart space information since it is mains driven, has many connectivity techniques and plenty of memory available. It is also located centrally in the smart space topology, meaning that there is not a huge number of hops needed to reach all the devices. In larger smart spaces, this criterion can be useful in simplifying the update propagation. The mobile terminal 60 knows that since it itself is a battery powered device it does not necessarily want to distribute the updated information by itself even though from the connectivity point of view it could be possible. Instead, it distributes the information to the most capable device that can further best service the whole smart space.

When the DVD player 20 receives the updated smart space information from the mobile phone it makes the decision to distribute the information further. Since it knows it is the only device that can interact with the LCD television 10, it synchronizes the received smart space information with it (via UWB). It also synchronizes with the WLAN access point 50 (via WLAN) and remote control 30 (via Bluetooth). Lastly, the remote control 30 synchronizes with the temperature sensor 40.

Another possibility for the mobile terminal 60 is to transfer the updated smart space information to every other device in this space except the LCD television 10 because the lack of UWB connectivity. If the mobile terminal 60, for example, has an AC power cord attached, it may choose to distribute the updated smart space information to the DVD player 20, remote control 30, temperature sensor 40, and WLAN access point 50. From the mobile terminal point of view this is possible because there is no need to consider power consumption in this case.

Figure 11:
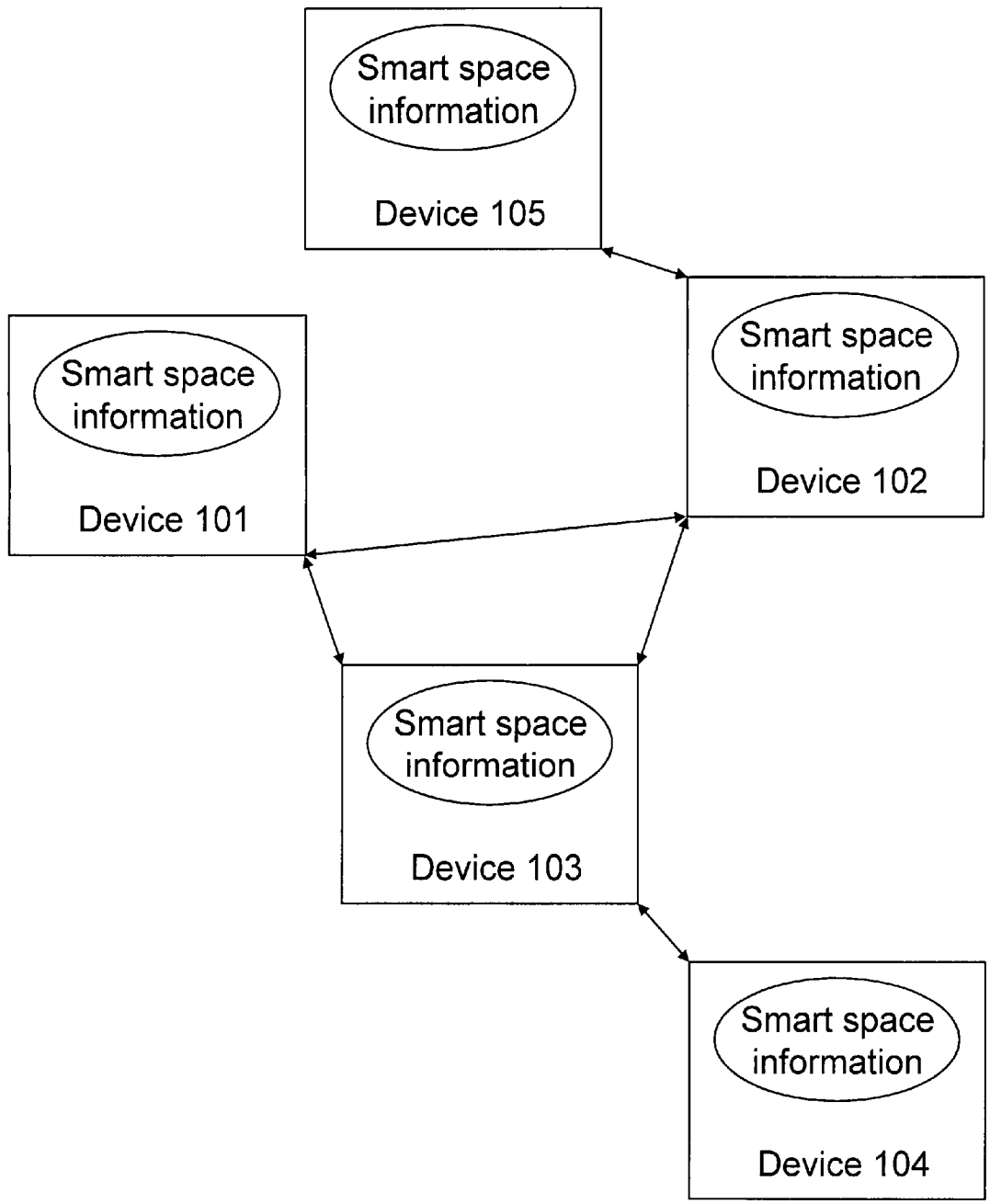
FIG. 11 shows yet another embodiment.

FIG. 11 shows yet another embodiment, in which the smart space information (connectivity, service and/or device characteristics information, and/or any information, for example, in a de-centralised information repository) is shared between devices in a smart space. Each device 101-105 of the smart space has its own physical copy of the smart space information. The arrows are showing the connectivity possibilities between devices; hence there is no direct connectivity, for example, between device 103 and device 105, since these devices 103 and 105 do not have a common bearer or their bearer does not reach each other. It is now assumed that device 103 is making an information addition into the smart space information. In order to have the smart space information of different devices in sync, this addition is copied to the other devices. Device 103 can copy this information to the closest device and assume that information is delivered forward. However, if device 103 selects device 104 to be the only device where the information is copied, then the information is not delivered at all to devices 101, 102 and 105.

An optimal route of distributing is found by looking the connectivity maps shared by the devices 101-105 of the smart space. The connectivity maps show the possible connectivity possibilities between devices (not all devices may be directly able to communicate with other devices of the smart space if they do not share a common radio technology or bearer). In this example, device 103 finds out the most efficient way to distribute information to other devices in the same smart space based on the connectivity map stored in the device. Accordingly, device 103 decides that it has to send out the information to device 104, because that will otherwise miss the information. In addition, device 103 decides that it has to send the information at least to device 102. Device 102 has connectivity to provide this information for the rest of the smart space devices 101 and 105.

Although in the embodiment shown in FIG. 9, the optimal route of delivery was decided based on connectivity information, it is also possible to use device characteristics information in the decision making as shown in other embodiment(s).

Figure 12:
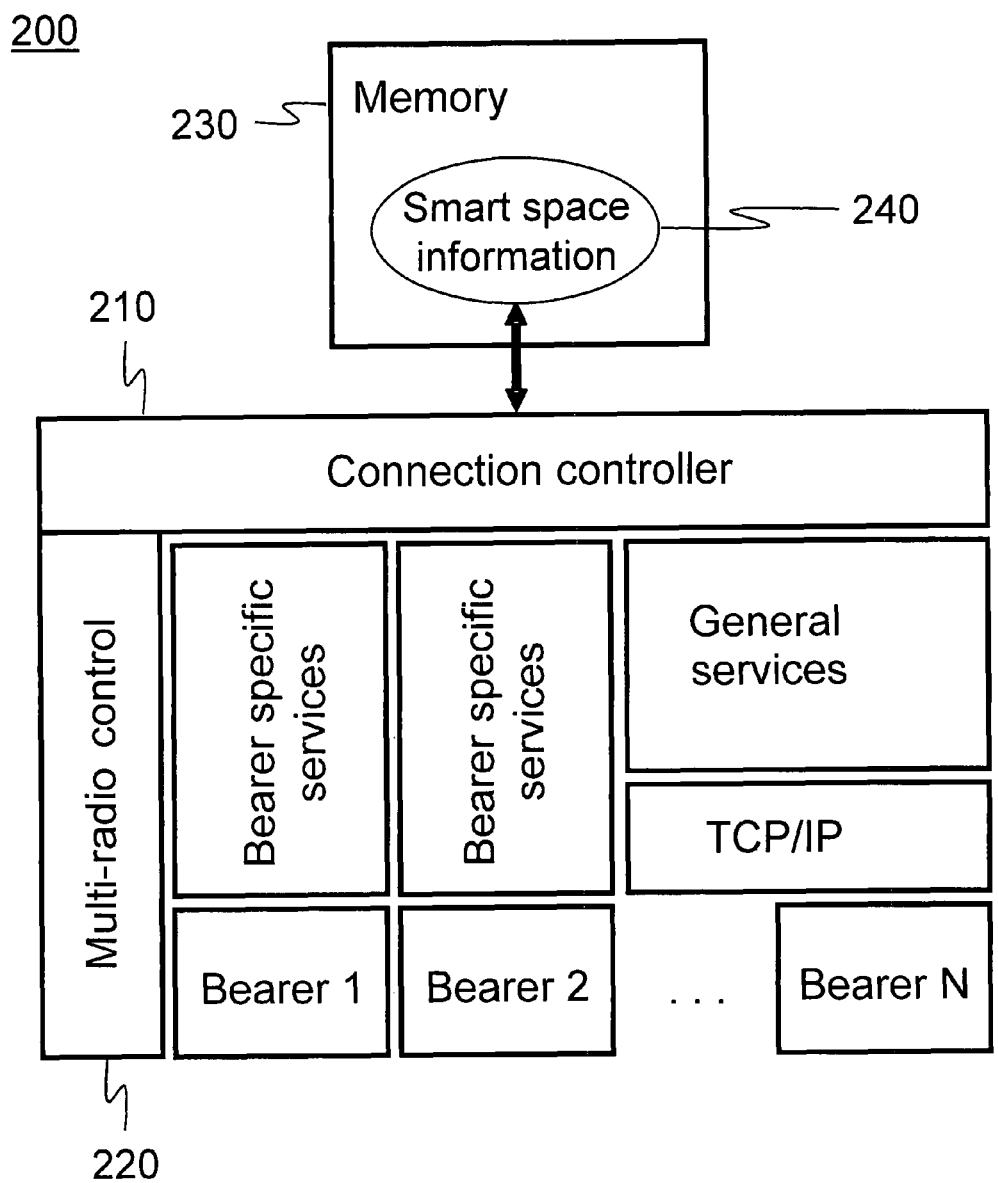
FIG. 12 shows an embodiment of a smart space apparatus.

FIG. 12 shows an embodiment of a smart space device or apparatus 200. The smart space device 200 comprises one or more bearers (Bearer 1, Bearer 2, ..., Bearer N). Each bearer may have bearer specific services. The smart space device 200 may further have a TCP/IP and/or another suitable protocol stack and general services on top of that.

The smart space device 200 comprises a connection controller 210, which may contain a processing unit, such as a microprocessor. A multi-radio control block 220 takes care of the usage of the radios (bearers). It may be that all of the bearers are not usable at the same time. The smart space device 200 further comprises a memory 230, which has stored therein smart space information 240. The smart space information 240 may, for example, comprise connectivity information, service information and device characteristics information of the smart space. The connection controller updates the smart space information 240 as required, and makes based on it decisions about the routes of distributing updated information to other devices of the smart space.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus, comprising:
    a memory configured to store and maintain connectivity information of devices of a smart space, the devices of the smart space using a plurality of disparate radio access technologies to communicate with each other, and wherein the connectivity information defines a connectivity map comprising radio bearer information for one or more radio bearers for at least two of the plurality of disparate radio access technologies used by at least two of the devices to communicate with each other;
    a processor coupled to the memory; and
    a transceiver coupled to the memory,
    a the processor being configured to cause the transceiver to propagate via a selected radio bearer the connectivity information to at least one device of the smart space other than the at least two devices of the smart space, the selected radio bearer different from at least one of the one or more radio bearers used by at least two of the devices to communicate with each other.

2. The apparatus of claim 1, wherein the memory further comprises about services provided by the smart space devices and wherein the processor is further arranged to cause the transceiver to propagate information about services provided by the smart space devices.

3. The apparatus of claim 1, wherein the memory has stored accessibility information about where and how a certain service or information which the apparatus can not provide by itself is accessible, and wherein the processor is arranged to cause such accessibility information to be delivered, using the transceiver, to another device of the smart space.

4. The apparatus of claim 1, wherein the processor is arranged to decide a distribution route, based on shared device characteristics and/or topology information, for information which needs to be shared and to cause the transceiver to propagate the information over at least part of the distribution route.

5. The apparatus of claim 1, wherein the processor is further arranged to cause to be propagated to another device of the smart space information comprised by a logical information repository, which is common to each of the devices of the smart space.

6. The apparatus of claim 1, wherein the memory comprises a service advertisement board, for advertising different services provided by the devices of the smart space, and wherein the connectivity information contains information on which devices in the smart space store the service advertisement board.

7. The apparatus of claim 1, wherein the connectivity information is arranged in a connectivity map in a low interconnect section of a device which is compliant with a service based interconnect centric platform architecture.

8. The apparatus of claim 1, wherein the disparate radio access technologies are selected from a group comprising at least: Bluetooth, WLAN, WiMAX, Wibree, UWB, and cellular technologies.

9. The apparatus of claim 1, wherein the apparatus cannot communicate via at least one of the at least two disparate radio access technologies.

10. The apparatus of claim 1, wherein the at least one device of the smart space other than the at least two devices cannot communicate using at least one of the at least two of the plurality of the disparate radio access technologies used by the at least two of the devices.

11. A method, comprising:
    storing and maintaining in a smart space device connectivity information of devices of the smart space, the devices of the smart space using a plurality of disparate radio access technologies to communicate with each other, and wherein the connectivity information defines a connectivity map comprising radio bearer information for one or more radio bearers for at least two of the plurality of disparate radio access technologies used by at least two of the devices to communicate with each other;
    the smart space device transmitting the connectivity information via a selected radio bearer to at least one device of the smart space other than the at least two devices of the smart space, the selected radio bearer different from at least one of the one or more radio bearers used by at least two of the devices to communicate with each other.

12. The method of claim 11, wherein the method further comprises transmitting information about services provided by the smart space devices.

13. The method of claim 11, wherein the method comprises:
    receiving connectivity information at the smart space device over a first radio bearer from a first device in the smart space; and
    transmitting connectivity information to another device of the smart space over another radio bearer.

14. The method of claim 11, wherein the method comprises:
    deciding a distribution route, based on shared device characteristics, for information which needs to be shared; and
    transmitting the information over at least a portion of the distribution route.

15. The method of claim 11, wherein the method comprises transmitting to another device of the smart space information comprised by a logical information repository, which is common to each of the devices of the smart space.

16. The method of claim 11, wherein the method comprises arranging the connectivity information in a connectivity map in a low interconnect section of a device which is compliant with a service based interconnect centric platform architecture.

17. The method of claim 11, wherein the disparate radio access technologies are selected from a group comprising at least: Bluetooth, WLAN, WiMAX, Wibree, UWB, and cellular technologies.

18. A computer-readable medium encoded with instructions that, when executed by a computer, perform:
    storing and maintaining in a smart space device connectivity information of devices of the smart space, the devices of the smart space using a plurality of disparate radio access technologies to communicate with each other, and wherein the connectivity information defines a connectivity map comprising radio bearer information for one or more radio bearers for at least two of the plurality of disparate radio access technologies used by at least two of the devices to communicate with each other; and the smart space device transmitting via a selected radio bearer the connectivity information to at least one other device of the smart space, the selected radio bearer different from at least one of the one or more radio bearers used by at least two of the devices to communicate with each other.

19. The computer-readable medium of claim 18, further encoded with instructions that, when executed by a computer, perform:

receiving connectivity information at the smart space device over a first radio bearer from a first device in the smart space; and transmitting connectivity information to another device of the smart space over another radio bearer.

20. The computer-readable medium of claim 18, further encoded with instructions that, when executed by a computer, perform:

deciding a distribution route, based on shared device characteristics, for information which needs to be shared; and transmitting the information over at least a portion of the distribution route.

\* \* \* \* \*